Aug. 4, 1925.

S. H. DICE

SOLDERING TOOL

Filed May 10, 1923

INVENTOR:
Samuel H. Dice,
BY Fraentzel and Richards,
ATTORNEYS

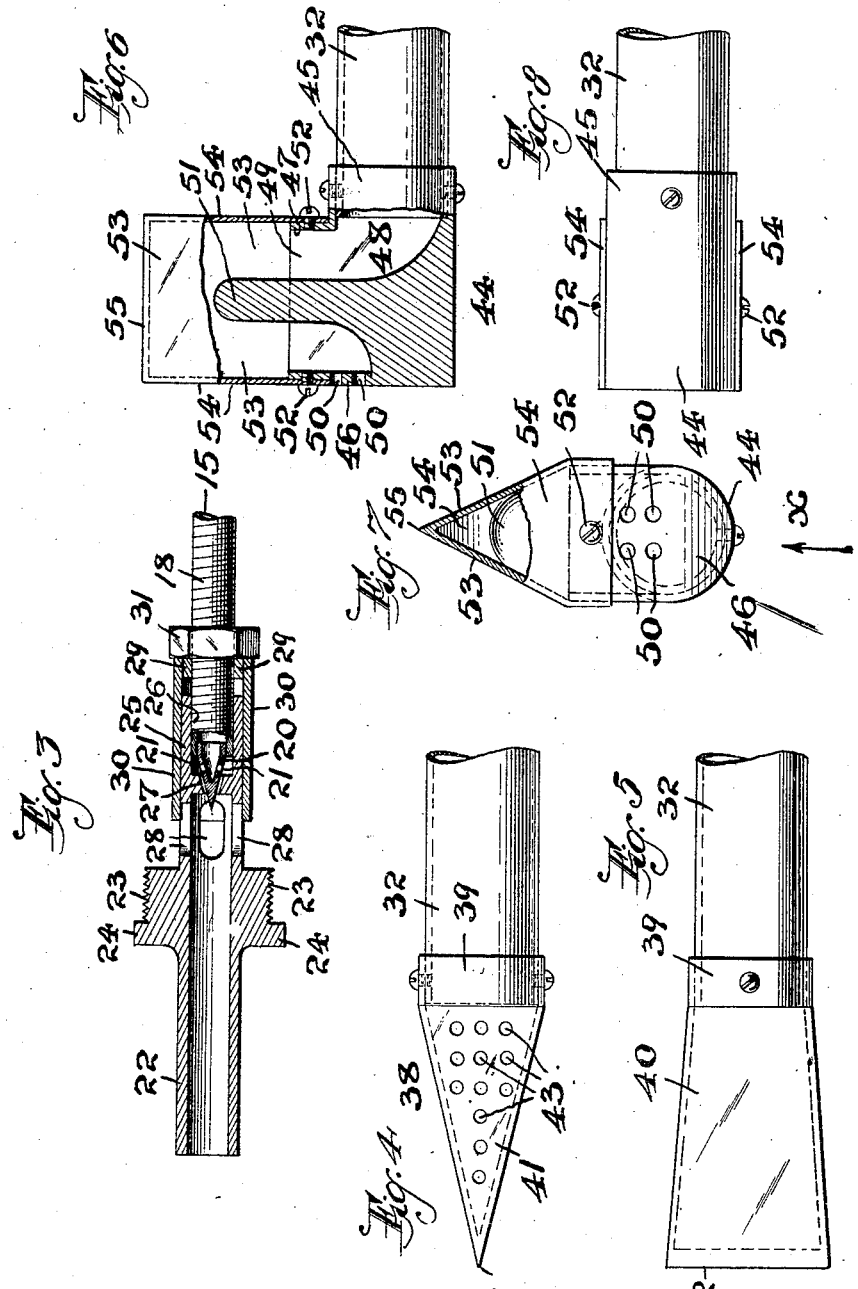

Patented Aug. 4, 1925.

1,548,447

UNITED STATES PATENT OFFICE.

SAMUEL H. DICE, OF NEWARK, NEW JERSEY.

SOLDERING TOOL.

Application filed May 10, 1923. Serial No. 637,938.

*To all whom it may concern:*

Be it known that I, SAMUEL H. DICE, a citizen of the United States, residing at Newark, in the county of Essex and State of New Jersey, have invented certain new and useful Improvements in Soldering Tools; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates, generally, to improvements in soldering tools; and, the present invention has reference, more particularly, to a novel and simply constructed soldering tool or iron adapted for easy attachment to a gas-conveying tube, the gas, such as illuminating gas, being conducted into and through the main body of the tool to an adjustably disposed valve, at which point after the regulated gas-supply leaves the valve it is suitably intermixed with air, so as to provide an intense flame and excessive heat for the proper use and manipulation of the tool during the soldering operation.

The present invention has for its principal objects to provide a novel and simply constructed soldering tool or iron of the general character hereinafter more fully set forth, with a view of providing a handy soldering iron for household purposes, in which the several devices and parts are arranged in a manner that there will be a proper mixture of gas and air, so as to produce perfect combustion, and which enables the use of the tool in any position, without the flame becoming extinguished, even when the tool is held vertically with soldering end of the tool pointing in a downward direction.

Other objects of the present invention not at this time more particularly enumerated will be clearly understood from the following detailed description of the present invention.

With the various objects of the present invention in view, the said invention consists, primarily, in the novel soldering tool hereinafter more fully set forth; and the said invention consists, furthermore, in the novel arrangements and combinations of the several devices and parts, as well as in the details of the construction of the said parts, all of which will be more particularly described in the following specification, and then finally embodied in the clauses of the claim, which are appended to and which form an essential part of the said specification.

The invention is clearly illustrated in the accompanying drawings, in which:—

Figure 3 is a longitudinal vertical section, on an enlarged scale, showing in detail, the general arrangement of the gas-regulating valve, and the air-receiving means, in the form of a tubular member in which the air is mixed with the gas after the latter has left the valve.

Figure 4 is a side elevation, and Figure 5 a top view of a different form of soldering tip for use with the present construction of soldering tool or iron.

Figure 6 is a view partly in side elevation and partly in longitudinal section of another form of soldering tip adapted for use with the soldering tool or iron; Figure 7 is a view partly in end elevation and partly in transverse section of the said soldering tip; and Figure 8 is a view of the parts represented in said Figures 6 and 7, looking in the direction of the arrow $x$ in said Figure 7.

Similar characters of reference are employed in all of the said above described views, to indicate corresponding parts.

Figure 1:
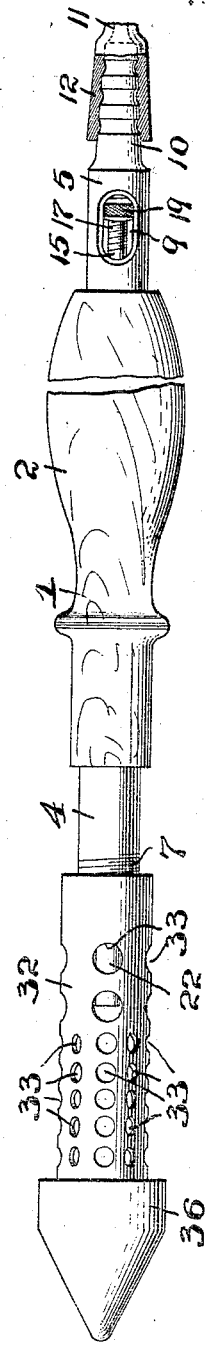
Figure 1 is a side elevation of a soldering tool or iron, showing one embodiment of the principles of the present invention.
Figure 2:
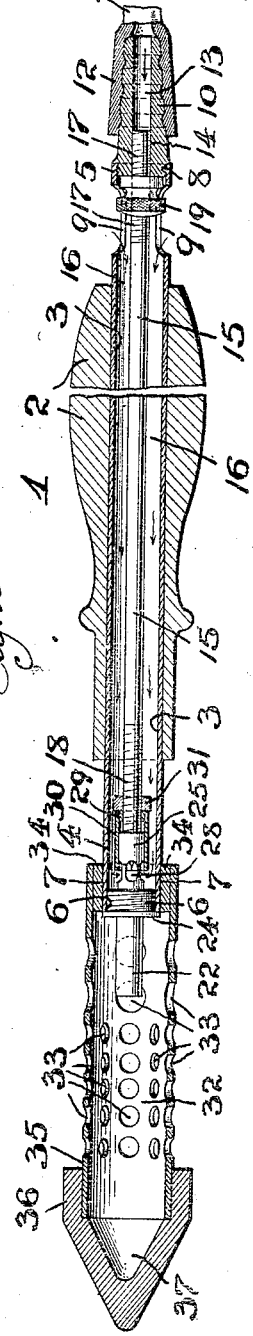
Figure 2 is a longitudinal vertical section of the same.

Referring now to the several figures of the drawings, the reference-character 1 indicates one form of complete soldering tool or iron made according to and embodying the principles of the present invention, the same comprising a main tubular member or element 2, usually made of wood or other suitable material, and which serves as a handle for the proper manipulation of said tool. Suitably disposed within the tubular portion of said handle is a main air-conveyor tube or pipe 3 having its end-portions 4 and 5 projecting from and extending beyond the respective ends of the said handle, substantially as shown in Figures 1 and 2 of the drawings. The end-portion 4 of said tube 3 is internally screw-threaded, as at 6, and externally screw-threaded, as at 7; and, likewise, the end-portion 5 of said tube 3 is internally screw-threaded, as at 8. The said end-portion 5 is also provided with a plurality of suitably shaped openings, as 9, located between the extreme end of the said tube 3 and the end of the handle 2, substantially as shown. Screwed into the internally screw-threaded portion 8 of said end 5 of the tube or pipe 3 is a suitably-formed gas-nipple or connection, as 10, for attachment thereto of the end-portion 12 of a flexible or other suitable gas-conducting tube or pipe 11. The said gas-nipple or connection 10 is provided with a longtudinally extending duct 13 which is also internally screw-threaded, as at 14. Concentrically disposed within the said main air-conveying tube or pipe 3 is a gas-conveying tube or pipe 15 of much smaller cross-sectional area than that of the tube or pipe 3, so as to be surrounded by a space 16, as shown in said Figure 2 of the drawings. As shown, the respective end-portions of the said tube or pipe 15 are externally screw-threaded, as 17 and 18, the screw-threaded end-portion 17 being screwed into the screw-threaded portion 14 of the gas-nipple or connection 10, and being movably disposed in said portion 14 when turned by means of a manipulating device or fingerpiece 19 which is suitably secured in a fixed position upon the screw-threaded portion 17 of the tube or pipe 15. Suitably secured in the open end of the screw-threaded portion 18 of the tube or pipe 15, and suitably projecting from said end, is a hollow or chambered cone-shaped member 20, providing a needle-valve, formed with suitably disposed gas-outlets or holes, as 21. The reference-character 22 indicates a mixing tube, providing a tubular flame-ejector or burner, which is provided with a screw-threaded enlargement 23 formed with an annular flange or shoulder 24 for securing the same in its position within the internally screw-threaded portion 6 of the end-portion 4 of the air-conveying tube or pipe 3, substantially as illustrated in Figure 2 of the drawings. The portion 25 of said flame-ejector or burner is internally screw-threaded, as at 26, for the screwing therein of a screw-threaded portion 18 of the gas conveying tube or pipe 15, and the proper adjustment of the cone-shaped valve-member 20 with relation to a correspondingly shaped valve-seat 27, with which said portion 25 is provided, as shown in Figure 3 of the drawings, when the said tube or pipe 15 is desirably manipulated by means of the fingerpiece 19, as will be clearly evident. The said portion 25 of the flame-ejector or burner is also provided with a plurality of elongated air-inlets or openings 28, located between said enlargement 23 and the valve-seat 27, and operatively connected with the screw-threaded portion 18 of the gas-conveying tube or pipe 15, by means of a screw-threaded member 29, at a suitable point upon said portion 18 in front of the extreme end of the portion 25 of the said flame-ejector or burner, is a tubular shutter or regulator-tube 30 which is loosely fitted over said portion 25 and is adapted to be rotated and moved longitudinally upon said portion 25, by means of the said tube or pipe 15, for the proper and desired adjustment of the said air-inlets or openings 28 and for the proper mixture of the air and gas, as will be clearly understood from an inspection of said Figures 2 and 3 of the drawings.

The said screw-threaded portion 18 of the tube or pipe 15 may also have disposed thereon a lock-nut 31 for maintaining the shutter or regulator-tube 30 in its fixed position upon said portion 18 and so that it will turn with said tube or pipe 15 when the latter is manipulated by means of its actuating device or fingerpiece 19, as will be evident. The reference-character 32 indicates another tubular member or element, providing a flame or heat-chamber, the said member or element 32 being perferably provided with variously placed ventilator-openings or perforations, as 33, and within one of its end-portions, the said member or element 32 is provided with an internally screw-threaded ring or collar 34, for securing the said member or element 32 in its operative position upon the screw-threaded part 7 of the end-portion 4 of the main air-conveying tube or pipe 3. Suitably secured over the end 35 of the said member or element 32 is a soldering tip, as 36, the tip in this case being made cone-shaped, as shown, said cone-shaped tip being provided in the usual manner with the usual soldering composition, and the said cone-shaped tip being preferably made with a chamber 37, as shown. The said tip may be made of any suitable metal, and if desired, may be made of sheet metal.

In lieu of the cone-shaped soldering tip 36, I may use a soldering tip 38, such as is illustrated in Figures 4 and 5 of the drawings, said tip 38 being chambered and comprising a collar 39 for attachment of the tip to the member or element 32, and from which collar extend side members 40 and 41, the members 41 being of triangular configuration, and the various members 40 and 41 meeting in a comparatively sharp marginal soldering edge 42, as shown. Some of the said side-members may also be provided with ventilator-holes or perforations, as 43.

Another form of soldering tip, which may be used with the hereinbefore described soldering tool or iron, is shown in Figures 6, 7 and 8 of the drawings, the tip being known as the tomahawk tip, this tip consisting, essentially, of a chambered body-member 44 formed with a collar 45 for attachment of the tip to the member or element 32. At right angles to the throat formed by the collar 45, the said chambered body-member 44 is formed with side-members 46, 47 and 48, to provide a heat-outlet 49. The side-member 46 is provided with suitably disposed ventilator-holes or perforations 50, and the interior of said body-member 44 may be formed with a suitably disposed baffle, as 51. Mounted over the said side-members 46, 47 and 48, and secured thereto by means of screws 52, or in any other suitable manner, is a hollow tip-member comprised of the side-members 53 and the end-members 54, the latter being of triangular configuration, and the various members 53 and 54 meeting in a sharp soldering edge 55, as shown.

From the foregoing description of the present invention it will be clearly seen, that I have devised a simply constructed soldering tool or iron, and one which may be used, while soldering, at any angle to the work, and I have found in practice that with a soldering tool made according to the principles herein described, the tool can just as readily be used vertically, with the soldering tip pointed in a downward direction, without choking off either the supply of gas or air, and in consequence still obtaining a proper mixture of the gas and air, and hence a good combustion and flame for efficiently heating the tip.

The operation of the device is simple and will be clearly understood from the foregoing description and from an inspection of the several figures of the drawings, and any further description of the operation of the device is therefore deemed unnecessary.

Of course, I am aware that the present invention is capable of some changes in the general arrangements and combinations of the various devices and parts, as well as in the details of the construction of the said parts, without departing from the scope of the present invention as set forth in the foregoing specification, and as defined in the clauses of the claim which are appended thereto. Hence, I do not limit my present invention to the exact arrangements and combinations of the various devices and parts, as described in the specification, nor do I confine myself to the exact details of the construction of the said parts, as illustrated in the accompanying drawings.

I claim:—

1. A soldering tool comprising a main tubular air-conducting element, provided at one end with means for the attachment of a nipple thereto, and for the attachment to its other end of a soldering element, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a valve-seat located within the other end of said air-conducting element, and a hollow cone-shaped valve-member connected with the discharging end of said tubular gas-conducting element, said valve member being provided with a gas-outlet for conveying gas from said gas-conducting element between the valve-member and said valve-seat.

2. A soldering tool comprising a main tubular air-conducting element, provided at one end with means for the attachment of a nipple thereto, and for the attachment to its other end of a soldering element, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a valve-seat located within the other end of said air-conducting element, a hollow cone-shaped valve-member connected with the discharging end of said tubular gas-conducting element, said valve-member being provided with a gas-outlet for conveying gas from said gas-conducting element between the valve-member and said valve-seat, and means upon said tubular gas-conducting element for regulating the position of said valve-member with relation to said valve-seat.

3. A soldering tool comprising a main tubular air-conducting element, provided at one end with means for attachment of a nipple thereto, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a mixing tube attached to the other end-portion of said air-conducting element, and a soldering element connected with said mixing tube, said mixing tube being provided with means for admitting air from said air-conducting element into said mixing tube, a valve-seat within said mixing tube located in front of said air-admitting means, and a hollow cone-shaped valve-member connected with the discharging end of said tubular gas-conducting element, said valve-member being provided with a gas-outlet for conveying gas from said gas-conducting element between the valve-member and said valve-seat into said mixing tube.

4. A soldering tool comprising a main tubular air-conducting element, provided at one end with means for attachment of a nipple thereto, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a mixing tube attached to the other end-portion of said air-conducting element, and a soldering element connected with said mixing tube, said mixing tube being provided with means for admitting air from said air-conducting element into said mixing tube, a valve-seat within said mixing tube located in front of said air-admitting means, a hollow cone-shaped valve-member connected with the discharging end of said tubular gas-conducting element, said valve-member being provided with a gas-outlet for conveying gas from said gas conducting element between the valve-member and said valve-seat into said mixing tube, and means upon said tubular gas-conducting element for regulating the position of said valve-member with relation to said valve-seat.

5. A soldering tool comprising a main tubular air-conducting element, provided at one end with means for attachment of a nipple thereto, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a mixing tube attached to the other end-portion of said air-conducting element, and a soldering element connected with said mixing tube, said mixing tube being provided with means for admitting air from said air-conducting element into said mixing tube, a tubular shutter movably mounted upon said mixing tube for regulating the supply of air through the said air-admitting means of said mixing tube, a valve-seat within said mixing tube located in front of said air-admitting means, a hollow cone-shaped valve-member connected with the discharging end of said tubular gas-conducting element, said valve-member being provided with a gas-outlet for conveying gas from said gas-conducting element between the valve-member and said valve-seat into said mixing tube.

6. A soldering tool comprising a main tubular air-conducting element, provided at one end with means for attachment of a nipple thereto, a handle mounted upon said tubular element, a tubular gas-conducting element within said tubular air-conducting element, said gas-conducting element being also provided with means for attachment to said nipple, said air-conducting element being provided at a point near said nipple with means for admitting air into said air-conducting element, a mixing tube attached to the other end-portion of said air-conducting element, and a soldering element connected with said mixing tube, said mixing tube being provided with means for admitting air from said air-conducting element into said mixing tube, a tubular shutter movably mounted upon said mixing tube for regulating the supply of air through the said air-admitting means of said mixing tube, a valve-seat within said mixing tube located in front of said air-admitting means, a hollow cone-shaped valve-member connected with the discharging end of said tubular gas-conducting element, said valve-member being provided with a gas-outlet for conveying gas from said gas-conducting element between the valve-member and said valve-seat into said mixing tube, means upon said tubular gas-conducting element for regulating the position of said valve-member with relation to said valve-seat, and means also mounted upon said gas-conducting element and co-operating with said tubular shutter for adjusting the latter with relation to the air-admitting means of said mixing tube.

7. The herein-described soldering tool comprising a main air-conducting tube having one end-portion thereof internally screw-threaded for attachment thereto of a nipple, a handle mounted upon said tube, said tube at its other end-portion being both internally and externally screw-threaded, a tubular and perforated member providing a flame-chamber having an internally screw-threaded end-portion screwed upon the externally screw-threaded end-portion of said air-conducting tube, a chambered soldering tip mounted over the other end-portion of said tubular member, a gas-conducting tube within said air-conducting tube, said gas-conducting tube having externally screw-threaded end-portions, one of said end-portion serving as a means for connecting the inlet-end of said gas-conducting tube with said nipple, said air-conducting tube being provided at a point near said nipple with air-inlets, a mixing tube provided with an externally screw-threaded enlargement screwed into the internally screw-threaded end-portion of said air-conducting tube, said mixing tube being provided with air-inlets for admitting air from said air-conducting tube into said mixing tube, a valve-seat within said mixing tube located in front of the air-inlets of said mixing tube, a hollow cone-shaped valve-member connected with the discharging end of said gas-conducting tube, said valve-member being provided with a gas-outlet for conveying gas from said gas-conducting tube between the valve-member and the valve-seat into said mixing tube, and an internally screw-threaded tubular shutter screwed upon the other screw-threaded end-portion of said gas-conducting tube and having a portion movably disposed over said mixing tube at the air-inlet end thereof for regulating the supply of air into said mixing tube.

8. The herein-described soldering tool comprising a main air-conducting tube having one end-portion thereof internally screw-threaded for attachment thereto of a nipple, a handle mounted upon said tube, said tube at its other end-portion being both internally and externally screw-threaded, a tubular and perforated member providing a flame-chamber, having an internally screw-threaded end-portion screwed upon the externally screw-threaded end-portion of said air-conducting tube, a chambered soldering tip mounted over the other end-portion of said tubular member, a gas-conducting tube within said air-conducting tube, said gas-conducting tube having externally screw-threaded end-portions, one of said end-portions serving as a means for connecting the inlet-end of said gas-conducting tube with said nipple, said air-conducting tube being provided at a point near said nipple with air-inlets, a mixing tube provided with an externally screw-threaded enlargement screwed into the internally screw-threaded end-portion of said air-conducting tube, said mixing tube being provided with air-inlets for admitting air from said air-conducting tube into said mixing tube, a valve-seat within said mixing tube located in front of the air-inlets of said mixing tube, a hollow cone-shaped valve-member connected with the discharging end of said gas-conducting tube, said valve-member being provided with a gas-outlet for conveying gas from said gas-conducting tube between the valve-member and the valve-seat into said mixing tube, an internally screw-threaded tubular shutter screwed upon the other screw-threaded end-portion of said gas-conducting tube and having a portion movably disposed over said mixing tube at the air-inlet end thereof for regulating the supply of air into said mixing tube, and a lock-nut upon said screw-threaded end-portion of the gas-conducting tube for securing said shutter in a fixed position after adjustment of the same upon said gas-conducting tube.

9. The herein-described soldering tool comprising a main air-conducting tube having one end-portion thereof internally screw-threaded for attachment thereto of a nipple, a handle mounted upon said tube, said tube at its other end-portion being both internally and externally screw-threaded, a tubular and perforated member providing a flame-chamber having an internally screw-threaded end-portion screwed upon the externally screw-threaded end-portion of said air-conducting tube, a chambered soldering tip mounted over the other end-portion of said tubular member, a gas-conducting tube within said air-conducting tube, said gas-conducting tube having externally screw-threaded end-portions, one of said end-portions serving as a means for connecting the inlet-end of said gas-conducting tube with said nipple, said air-conducting tube being provided at a point near said nipple with air-inlets, a mixing tube provided with an externally screw-threaded enlargement screwed into the internally screw-threaded end-portion of said air-conducting tube, said mixing tube being provided with air-inlets for admitting air from said air-conducting tube into said mixing tube, a valve-seat within said mixing tube located in front of the air-inlets of said mixing tube, a hollow cone-shaped valve-member connected with the discharging end of said gas-conducting tube, said valve-member being provided with a gas-outlet for conveying gas from said gas-conducting tube between the valve-member and the valve-seat into said mixing tube, an internally screw-threaded tubular shutter screwed upon the other screw-threaded end-portion of said gas-conducting tube and having a portion movably disposed over said mixing tube at the air-inlet end thereof for regulating the supply of air into said mixing tube, and means upon said gas-conducting tube for regulating the position of said valve-member with relation to said valve-seat.

10. The herein-described soldering tool comprising a main air-conducting tube having one end-portion thereof internally screw-threaded for attachment thereto of a nipple, a handle mounted upon said tube, said tube at its other end-portion being both internally and externally screw-threaded, a tubular and perforated member providing a flame-chamber having an internally screw-threaded end-portion screwed upon the externally screw-threaded end-portion of said air-conducting tube, a chambered soldering tip mounted over the other end-portion of said tubular member, a gas-conducting tube within said air-conducting tube, said gas-conducting tube having externally screw-threaded end-portions, one of said end-portions serving as a means for connecting the inlet-end of said gas-conducting tube with said nipple, said air-conducting tube being provided at a point near said nipple with air-inlets, a mixing tube provided with an externally screw-threaded enlargement screwed into the internally screw-threaded end-portion of said air-conducting tube, said mixing tube being provided with air-inlets for admitting air from said air-conducting tube into said mixing tube, a valve-seat within said mixing tube located in front of the air-inlets of said mixing tube, a hollow cone-shaped valve-member connected with the discharging end of said gas-conducting tube, said valve-member being provided with a gas-outlet for conveying gas from said gas-conducting tube between the valve-member and the valve-seat into said mixing tube, an internally screw-threaded tubular shutter screwed upon the other screw-threaded end-portion of said gas-conducting tube and having a portion movably disposed over said mixing tube at the air-inlet end thereof for regulating the supply of air into said mixing tube, a lock-nut of said screw-threaded end-portion of the gas-conducting tube for securing said shutter in a fixed position after adjustment of the same upon said gas-conducting tube, and means upon said gas-conducting tube for regulating the position of said valve-member with relation to said valve-seat.

In testimony, that I claim the invention set forth above I have hereunto set my hand this 1st day of May, 1923.

SAMUEL H. DICE.

Witnesses:
    FRED H. FRAENTZEL,
    EVA E. DESCH.